US009881632B1

(12) United States Patent
Every (10) Patent No.: US 9,881,632 B1
(45) Date of Patent: Jan. 30, 2018

(54) SYSTEM AND METHOD FOR ECHO SUPPRESSION FOR IN-CAR COMMUNICATIONS

(71) Applicant: 2236008 Ontario Inc., Waterloo (CA)

(72) Inventor: Mark Robert Every, Surrey (CA)

(73) Assignee: 2236008 Ontario Inc., Waterloo, Ontario (CA)

( * ) Notice: Subject to any disclaimer, the term of this patent is extended or adjusted under 35 U.S.C. 154(b) by 0 days.

(21) Appl. No.: 15/398,371

(22) Filed: Jan. 4, 2017

(51) Int. Cl.
| | |
|---|---|
| *H04B 3/20* | (2006.01) |
| *G10L 21/0232* | (2013.01) |
| *H04R 1/40* | (2006.01) |
| *H04R 3/00* | (2006.01) |
| *H04R 3/04* | (2006.01) |
| *G10L 21/0208* | (2013.01) |
| *G10L 21/0216* | (2013.01) |

(52) U.S. Cl.
CPC .......... *G10L 21/0232* (2013.01); *H04R 1/406* (2013.01); *H04R 3/005* (2013.01); *H04R 3/04* (2013.01); *G10L 2021/02082* (2013.01); *G10L 2021/02166* (2013.01); *H04R 2499/13* (2013.01)

(58) Field of Classification Search
CPC ...... H04R 2499/13; H04R 3/005; H04R 3/04; H04R 1/406; G10L 2021/02082; G10L 2021/02166; G10L 21/0232
USPC ...................................................... 381/66, 86
See application file for complete search history.

(56) References Cited

U.S. PATENT DOCUMENTS

2014/0274218 A1* 9/2014 Kadiwala ............ H04M 1/6041
455/570

* cited by examiner

*Primary Examiner* — Paul S Kim
(74) *Attorney, Agent, or Firm* — Brinks Gilson & Lione (57) ABSTRACT

A system and method that enhances speech through reinforcement includes capturing an audio signal generated by the audio sources by one or more microphones; decomposing the audio signals into a plurality of virtual audio sources where the number of audio channels delivered by the audio sources is equal to the number of the plurality of virtual audio sources; estimating the echo paths from each of the plurality of virtual audio sources to the one or more microphones; and processing the captured audio signal in response to the estimated echo paths by subtracting the echo contributions of each of the virtual sources to the one or more microphones.

20 Claims, 5 Drawing Sheets

SYSTEM AND METHOD FOR ECHO SUPPRESSION FOR IN-CAR COMMUNICATIONS

BACKGROUND OF THE DISCLOSURE

1. Technical Field

This disclosure relates to relates to processing audio signals and in particular, to a system and method that reinforces speech and cancels echo.

2. Related Art

Many have struggled to hold a conversation in a car traveling at highway speeds. To maintain a conversation, a driver typically will raise his or her voice or turn his or her head around to be heard. This can lead to distractions and worse take the driver's eyes from the road. The disclosed in-car communication systems mediate this problem and dynamically improve acoustics in a vehicle.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

DETAILED DESCRIPTION

An in-car communication system enhances seat-to-seat communication in a vehicle such as a car moving at slow or at highway speeds. Instead of shouting or having to turn around to be heard, a driver or passenger can talk normally while keeping his or her eyes on the road. The system and method (referred to as a system) dynamically adapts to the noise conditions of vehicle's environment and dynamically adds acoustical enhancements. The system leverages the existing hands free telephony or communication microphones and infotainment loudspeakers within a vehicle making it a unitary part of the vehicle in some applications, and in others, an independent system that adds features that improve voice quality and seat-to-seat communication through echo and feedback cancellation.

Figure 1:
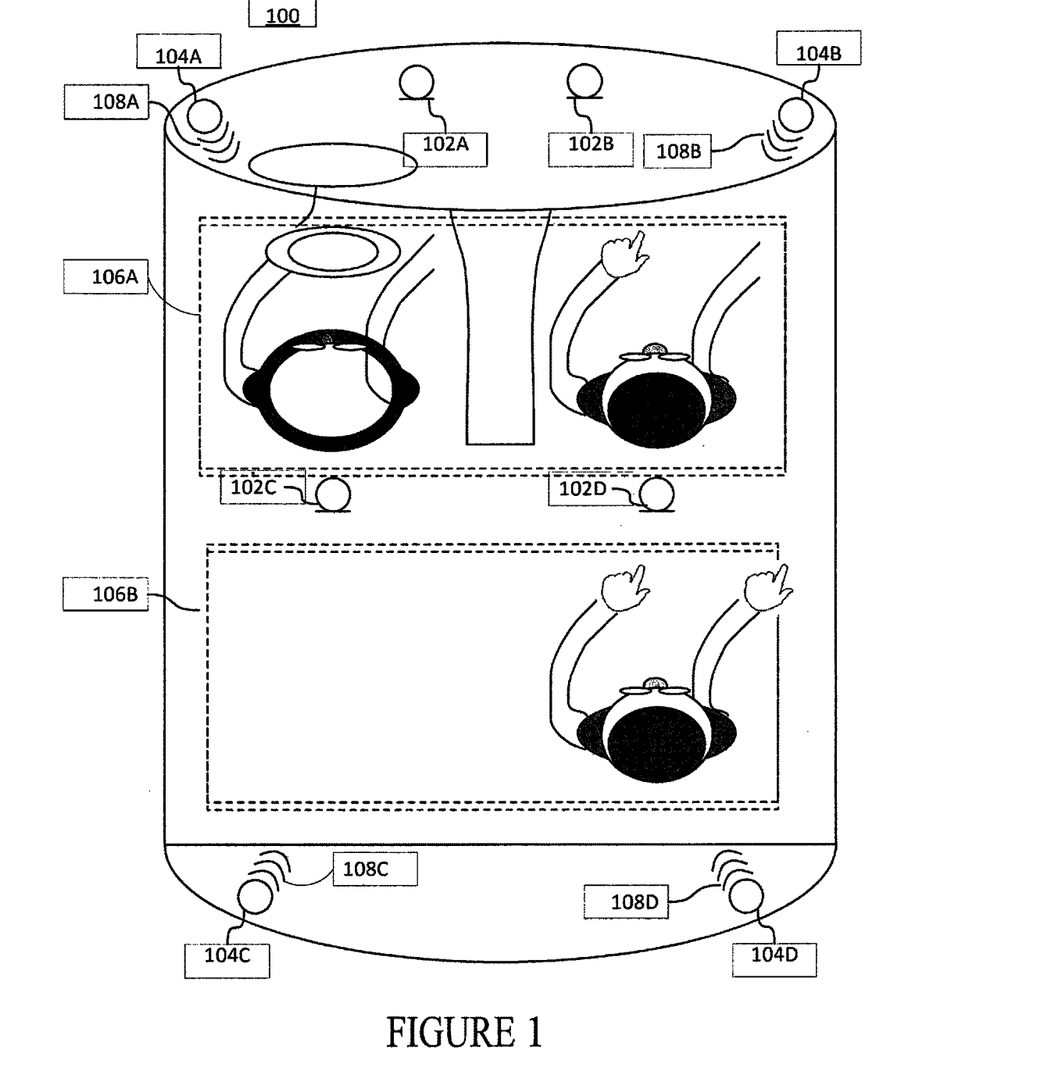
FIG. 1 is an overhead schematic view of a vehicle that includes a speech reinforcement in-car communication system.

In FIG. 1 the ICC system improves voice communication between occupants in the front and the rear of a vehicle 100. One or more driver or co-driver microphone signals captured by microphones 102 A and B are processed and played in rear zone 106 B of the vehicle 100 through loudspeakers 104 C and D. These loudspeakers are provided with front-to-back re-enforcing signals 108 C and D. Likewise, one or more rear microphone signals captured by microphones 102 C and D are processed and converted into audible sound in the front zone 106 A of the vehicle 100 through loudspeakers 104 A and B. These loudspeakers are provided with back-to-front re-enforcing signals 108 A and B. In FIG. 1 the driver and co-driver's voices are reinforced for the benefit of the passengers in the rear zone 106 B so that the driver or co-driver do not have to raise his/her voice or turn around to be heard. This is referred to as a front-to-back reinforcement. And, the rear passenger's voice is reinforced for the benefit of the driver and co-driver in the front zone 106 A. This is referred to as a back-to-front reinforcement.

Some ICC systems also include one or more optional enhancements in addition to an echo and feedback cancellation signal processing described below, including: noise reduction, equalization, adaptive gain, dynamics compression or limiting, feedback control and/or cancellation/reduction. A noise reduction removes noise from a microphone signal before it is rendered through loudspeakers. In a vehicle the noise that is caused by a defroster or blower blowing on a microphone, for example, may be removed by a signal processor before the microphone signal is rendered by a loudspeaker through a noise reduction signal processing operation. An equalization may process the microphone signal to restore or modify speech timbre or spectral color by an equalization signal processing operation. An adaptive gain adapts the gain (e.g., the amplification or attenuation) applied to the microphone signal based on the noise sensed or estimated in the vehicle's environment. An adaptive gain system measures the noise sensed or estimated in the car environment through one or more sensors and adjusts the gain applied to the microphone signal before the microphone signal is translated into sound through an adaptive gain signal processing operation. A dynamic compression or limiting reduces the volume or amplitude of loud sounds picked up by the microphone and/or amplifies quiet sounds by narrowing or compressing the audio signal's dynamic range through a signal processor executing dynamic range compression signal processing operation. An automated feedback control attenuates residual positive feedback which occurs when a sound loop is created between one or microphones (the audio input) and the audio output (one more loudspeakers) through a signal processor attenuating a feedback signal through a feedback control processing operation. And, the cancellation/reduction suppresses residual echo through a signal processor executing a residual noise and echo suppression signal processing operation described below.

In FIG. 1, the ICC system also operates when music and/or other infotainment are rendered in the vehicle 100 through loudspeakers 104 A through D. The echo generated by these signals can be picked up by microphones 102 A through D, and if unrestrained, it becomes part of reinforcement signals 108 A through D that flow through the reinforcement path.

In the front-to-back and in the back-to-front reinforcements, sound reflections or echo is further processed when reinforcement signals are received by the microphones if not restrained. In the front-to-back process, for example, echo would be processed when reinforcement signals 108 C and/or D played out of the one or more rear loudspeakers 104 C and/or D is picked up by one or more of the front zone microphones 102 A and/or B. If unrestrained, the echo is reprocessed and rendered through loudspeakers 104 C and/or D. In these conditions, the echo feeds back upon itself, and if left uncontrolled, results in a ringing or a howling that can occur at high amplitude levels causing physical discomfort to the listener and making it unusable or unsafe for the listener's hearing.

While the suppression of music and/or infotainment echo, and the reinforced signal that comes back to the microphones in the ICC system tends to conflict with the goal of optimizing voice quality, the systems shown in FIGS. 1-5, optimize the tradeoff of improving sound quality, reducing echo, and cancelling feedback.

Figure 2:
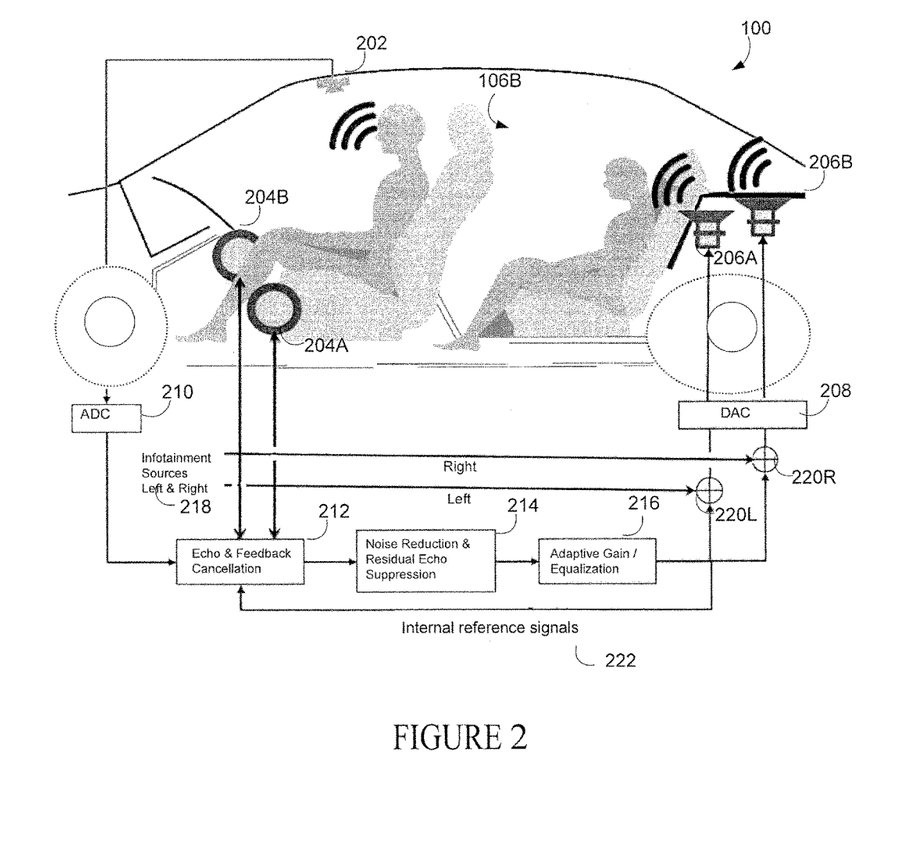
FIG. 2 is a side schematic view of the vehicle of the speech reinforcement in-car communication system in a front-to-back reinforcement that enhances front seat to rear seat communication.

FIG. 2 is a further schematic of the ICC system of FIG. 1 operating in a front-to-back reinforcement that can be further extended to a zone-to-zone reinforcement—where the zones comprise a front-left (or driver zone), front-right (co-driver zone), rear left (a passenger zone behind the driver), and rear-right (a passenger zone behind the co-driver). The ICC system of FIG. 2 includes a front/driver microphone 202, two front door loudspeakers 204 A and B and two rear loudspeakers 206 A and B. The ICC system shown within vehicle 100 also includes a device that translates digital data into analog signals (a DAC, 208), a device that converts continuously varying analog signals into digital data (an ADC, 210), an echo and feedback cancellation module 212, an optional noise reduction and residual echo suppression module 214, an optional adaptive gain and equalization module 216, and a signal adder circuit 220 L and R. In bidirectional ICC system operation, one or more rear ICC microphones are used in rear zone 106 B which allows the ICC system to process and render the rear passenger's reinforced signals over the front loudspeakers 204 A and B using the process that reinforces the driver's voice in a front-to-back reinforcement. In other alternative configurations, the entertainment signals and ICC reinforcement signals may be rendered by additional loudspeakers, e.g. tweeters or subwoofer. And, in other alternative systems the stereo infotainment source 218 shown as a two channel source may source one or more channels. For example, some ICC systems within vehicles process six channels such as the six channels used in Dolby 5.1 surround sound.

In known multi-channel echo canceller systems with J loudspeakers and M microphones, the systems attempt to model the signal paths from the J loudspeakers to the M microphones. These systems estimate the paths through an impulse response from loudspeaker j to microphone m, —which is h_j,m[n]. The impulse response is estimated on-line by the echo canceller. Here, "n" is the sample index. In these echo cancellers, there are J*M echo paths, so in the example vehicle 100 shown in FIG. 2 there would be four paths made up of the path from the front left (FL—driver) loudspeaker to the front microphone (h_1[n]), from the front right (FR—co-driver) loudspeaker to the front microphone (h_2[n]), from the rear left (RL—passenger behind the driver) loudspeaker to the front microphone (h_3[n]) and from the rear right (RR—passenger behind the co-driver) loudspeaker to the front microphone (h_4[n]). In a front-to-back reinforcement, a known system would output a mono reinforced signal, which would be summed with the RL and RR infotainment signals, meaning the four loudspeaker signals, x_1[n], x_4[n] is represented as:

x_1[n]=FL=music left
x_2[n]=FR=music right
x_3 [n]=RL=music left+ICC signal
x_4[n]=RR=music right+ICC signal
and the echo at the front microphone is represented as:

$$E[n]=x\_1[n]*h\_1[n]+x\_2[n]*h\_2[n]+x\_3[n]*h\_3[n]+x\_4[n]*h\_4[n],$$

where '*' represents convolution in the time-domain.

Broadly speaking, one of the objectives of an echo canceller is to estimate {h_j[n]; j=1, . . . , J} given the reference channels {x_j[n]]; j=1, . . . , J} and the microphone signal Y[n], and then subtract the echo E[n] from microphone signal Y[n] to render an echo cancelled microphone signal, D[n]. However, the four reference channels x_1[n], x_4[n] are not linearly independent making the echo cancellation algorithm undetermined. Consider the use case in which two loudspeakers are rendering the same content that is received by a single microphone. In this case, known systems cannot identify their sources because the content may be rendered by one of the loudspeakers, the other loudspeaker, or by both loudspeakers. In other words, when there are more loudspeakers than linearly-independent reference channels, there is not a unique optimal solution to the estimated echo paths h_j,m[n], and the echo signals cannot be optimally cancelled from the microphone signals. Some approaches reduce correlation between the reference signals by making a non-linear modification to the signals or by adding an uncorrelated signal to each channel. However, these approaches often result in a perceptual distortion of the signals or add a perceptual disturbance or noise to the signal.

In FIG. 2, the echo and feedback cancellation module 212 decomposes the non-uniqueness into "virtual" sources instead of signal paths where the number of reference channels is equal to the number of independent audio sources rather than the number of physical loudspeakers. In the front-to-back reinforcement of FIG. 2, the virtual sources comprise y_1[n]=music left
y_2[n]=music right
y_3[n]=ICC output
and the echo at the front microphone is:

$$E[n]=y\_1[n]*g\_1[n]+y\_2[n]*g\_2[n]+y\_3[n]*g\_3[n]$$

By comparison with the earlier formula, the transfer functions are equivalent if:

$$g\_1[n]=h\_1[n]+h\_3[n] \text{ (front left+rear left speakers)}$$

$$g\_2[n]=h\_2[n]+h\_4[n] \text{ (front right+rear right speakers)}$$

$$g\_3[n]=h\_3[n]+h\_4[n] \text{ (rear left+rear right speakers)}$$

where g_1[n] represents the transfer function from a virtual loudspeaker, consisting of the sum of front left 204 A and rear left speakers 206 A, to the front microphone 202.

By modeling three sources versus the four paths from each loudspeaker to the microphone the ICC system reduces microprocessor computing, reduce memory usage (e.g., random access memory consumption), improve echo and feedback cancellation performance, and it allows for the use of different tuning constants and coefficient update to be applied to the entertainment echo versus the reinforcement feedback paths, since these sources are separately modeled. Further, the challenges of the uniqueness problem are well avoided, as shown in FIG. 2, as there are three independent references and only three echo paths to be estimated so a solution is determinative. And further, the systems can separate the external virtual sources that are associated with playback of audio content into the vehicle cabin (e.g. music, navigation or voice recognition prompts, etc.) from the internal virtual sources (e.g., the speech reinforcement signal) that are the independent outputs of the ICC system and can result in feedback. This allows for further processing as further described below.

In short, the ICC system re-formulates the multichannel echo cancellation problem with J loudspeakers and M microphones in terms of S virtual independent sources and M microphones, where in many audio system configurations in vehicles, S<J. Further, while ICC system's operation has been described in the time-domain; alternative ICC systems operate in the frequency-domain by converting the time domain microphone signals into frequency domain signals through a Fast Fourier Transform (FFT), processing the rendered frequency domain sub-bands as described herein, and converting the processed frequency bands into a time domain signal once echo is cancelled and optionally suppressed as described below through an inverse FFT. Alternative sub-bands decomposition schemes that use filterbanks, wavelets, discrete cosine transforms or related methods can also be used to implement the described approach.

Figure 5:
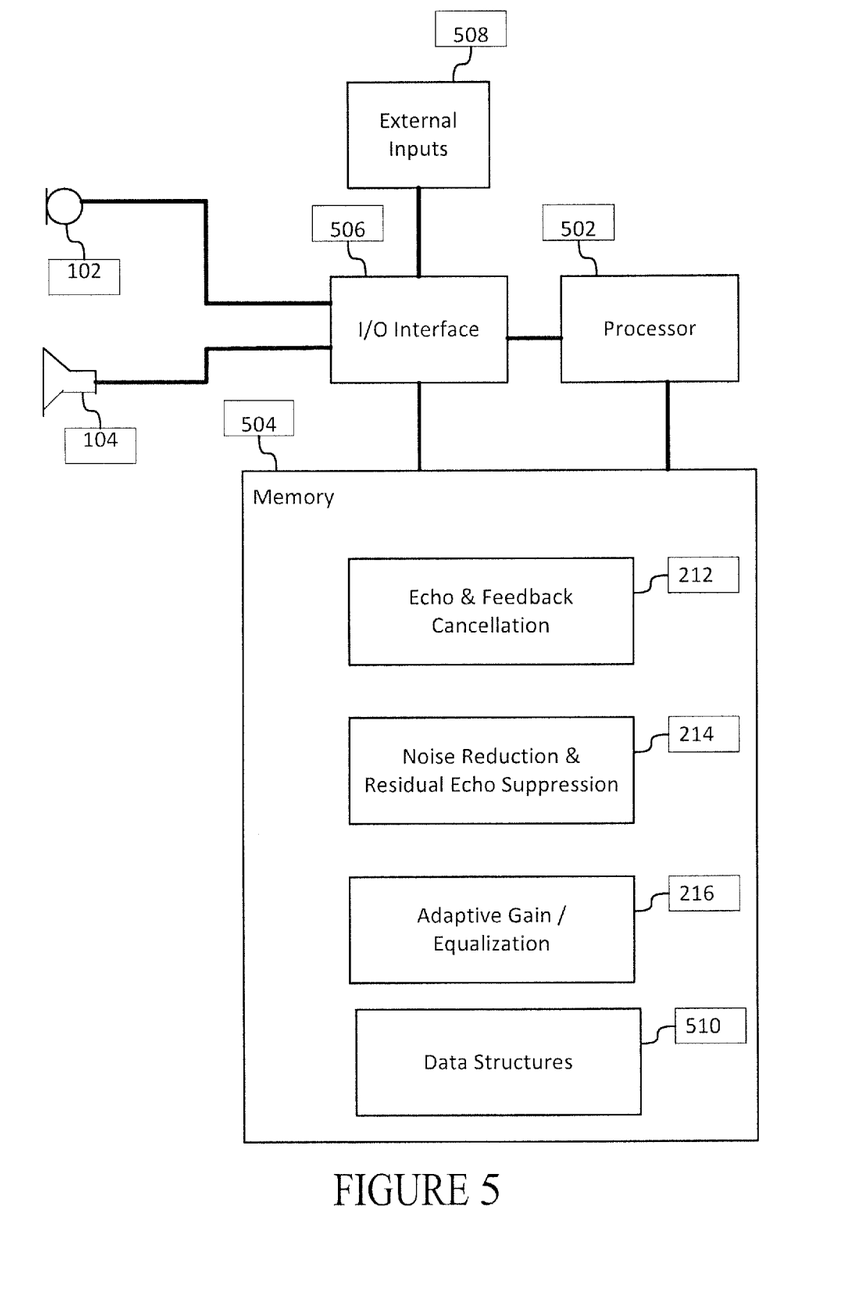
FIG. 5 is a block diagram of a third speech reinforcement in-car communication system that enhances seat-to-seat communication.

In yet another alternative, the ICC system may derive the virtual sources (e.g., the linearly independent sources) based on prior knowledge (e.g., stored characteristics retained in a non-transitory memory 504 of FIG. 5) about the mixing of the independent audio sources that drive the loudspeakers. Based on known characteristics the virtual sources may be partially or fully predefined. And in another alternative embodiment, the adaption rules of each of the virtual sources e.g., y_1[n], y_2[n], and y_3[n] for example, that renders E[n] may differ. And further, the adaption parameters of the echo and feedback cancellation module 212 or echo canceller instances may differ for each of the virtual sources. Here, the term "parameters" refers to variables. Variables may determine the speed at which an echo canceller converges on an echo signal or tunes echo canceller or it may comprise a threshold value, for example. The term "rule" refers to a prescribed process that controls the operation of the echo and feedback cancellation module 212. An exemplary rule might establish that the echo and feedback cancellation module 212 stops adapting each time a discontinuous period or gap in speech is detected. For example, a rule may permit an echo canceller adaption when speech energy exceeds a threshold parameter that indicate the presence of echo. It is a process that is followed such as when a condition occurs or is detected.

Residual echo may also be suppressed in FIGS. 1 and 2 based on the separation of the external virtual sources from the internal virtual sources. When the ICC microphone 202 picks up an echo caused by an external source such a music, the ICC system could play these signals back into the cabin (the prior music frames) by rendering them with the reinforcement signals. In this condition, the vehicle occupants would hear the original intended entertainment audio with a delayed version played earlier.

To mediate this condition, an ICC system can execute an optional echo suppression of audio sourced by the external sources 218 through the noise reduction and residual echo suppression module 214 of FIG. 2. When the linear echo cancellation 212 described above is not sufficient to substantially attenuate the echo within the vehicle cabin, a non-linear echo suppression or post-filter can be applied to the echo-cancelled microphone signals to substantially remove the residual echo through the noise reduction and residual echo suppression module 214. To avoid suppressing the desired talker's speech, which degrades the quality of the ICC system, a detector is used to discern external echo, from the echo of the reinforcement signals, and the audio sourced by local audio sources within the vehicle cabin.

In FIG. 2 the noise reduction and residual echo suppression module 214 may be activated based on a predicted echo level of each virtual source at each microphone. Alternatively, the noise reduction and residual echo suppression module 214 may activate through an activation function derived using the measured microphone levels and noise estimates that are compared to estimates stored in the non-transitory memory 504 of FIG. 5. In other alternative ICC systems, the activation function may be derived using the measured levels of the echo-cancelled microphone signals. In this alternative, the activation function may be used to selectively attenuate echo components while minimizing the attenuation of a desired signal such as local speech.

To achieve this detection and suppression, the ICC system decomposes the estimated energy into an external and an internal estimate. Decomposing the energy E[n] into two parts renders:

$$E[n]=E\_ext[n]+E\_int[n],$$

where:

$$E\_ext[n]=y\_1[n]*g\_1[n]+ \ldots +y\_R[n]*g\_R[n],$$

where R=number of external sources $$E\_int[n]=y\_1[n]*g\_1[n]+ \ldots +y\_S[n]*g\_S[n],$$

where S=number of internal/reinforcement sources.
In the front-to-back ICC reinforcement of FIG. 2:

$$E\_ext[n]=y\_1[n]*g\_1[n]+y\_2[n]*g\_2[n]$$

$$E\_int[n]=y\_3[n]*g\_3[n]$$

As before, g_1[n], g_2[n] and g_3[n] are estimated by the echo and feedback cancellation module 212. The ICC system then make comparisons between the signals E_ext[n], E_int[n], Y[n] and D[n], and renders a detection of an external echo, an echo of the reinforcement signals, or audio sourced by local audio sources from within the cabin, e.g. driver speech. By this detection, the noise reduction and residual echo suppression module 214 aggressively attenuates external echo and lightly attenuates or passes through signals detected during local speech events that known echo canceller models of the physical loudspeaker to microphone paths cannot accomplish.

In ICC systems operating in the frequency domain, the systems transform E_ext[n] and Y[n] into the frequency domain using a Discrete Fourier Transform (DFT), Discrete Cosine Transform (DCT), or one of many other methods, to obtain E_ext[k] and Y[k] respectively, where k is the frequency bin index.

In FIGS. 1 and 2 an exemplary detector of local audio source, e.g. desired talker, A[k] may be expressed as:

$$A[k] = \{1 \; ; Y[k] >= \text{beta}*E\_ext[k]$$
$$0 \; ; Y[k] < \text{beta}*E\_ext[k]\}$$

where beta is a tunable constant, that in some applications is frequency-dependent. A noise estimate, N[k], can also be performed:

$$A[k] = \{1 \; ; Y[k] >= \text{MAX}(\text{beta}*E\_ext[k], \text{alpha}*N[k])$$
$$0 \; ; Y[k] < \text{MAX}(\text{beta}*E\_ext[k], \text{alpha}*N[k])\}$$

where alpha is a tunable noise over-estimation factor.

When A[k]=0, the echo suppressor may apply a multiplicative attenuation to the echo-cancelled microphone signal, D[k], using one of multiple methods, e.g., by a Wiener filter or a spectral subtraction, for example. This may include temporal and/or frequency domain smoothing, and replacement of the attenuated frequency bins with comfort noise.

In cases where no external sources are detected, then E_ext[k]=0, and A[k] will act as a pass-through or serve as a noise suppressor. The detector can also be reformulated to apply a different attenuation to noise versus external echo. In these embodiments, for example, noise is attenuated by a predetermined level such as 10 dB, whereas external echo is attenuated by a much greater level (such as a multiple of the predetermined noise level), such as 30 dB and thereafter replaced with comfort noise added through an adder.

The noise reduction and residual echo suppression module 214 may also use information about the echo-cancelled microphone signal, D[k], when determining an attenuation level. In one exemplary use case, for example, if a target amount of echo reduction is about 30 dB, and by comparison of the microphone signal Y[k] vs. the echo-cancelled microphone signal, D[k] it is evident that the echo and feedback cancellation module 212 reduced external echo by 10 dB, then the noise reduction and residual echo suppression module 214 or post-filter need only apply 20 dB of attenuation to the residual echo in the echo-cancelled signal.

An echo suppressor may also use information from E_int[k]. For example, if the level of E_int[k] is similar to microphone signal Y[k], then this condition is an indication of strong feedback condition which could result in a howling or ringing if left uncontrolled. In this state, the echo and feedback cancellation module 212 may increase the level of echo cancellation applied by a dynamic level or alternatively apply an equalization curve to the reinforcement signals.

With the echo cancelled and suppressed, an optional adaptive gain equalization module 216 may apply equalization and/or adaptive gain. Here, the equalization modifies the tone color or timbre and the adaptive gain adjusts (e.g., amplifies or attenuates) the level of the reinforced signal rendered by the noise reduction and residual echo suppression module 214 as a result of the level of environmental noise sensed or estimated in the vehicle cabin. The adapted and equalized signal is then added to the signal sourced by the stereo infotainment source 218 through the signal adder circuit 220 L and R, respectively. Thereafter, the reinforced signal is translated into analog signals by DAC 208 and transmitted into the rear zone 106 B by the two rear loudspeakers 206 A and B.

Figure 3:
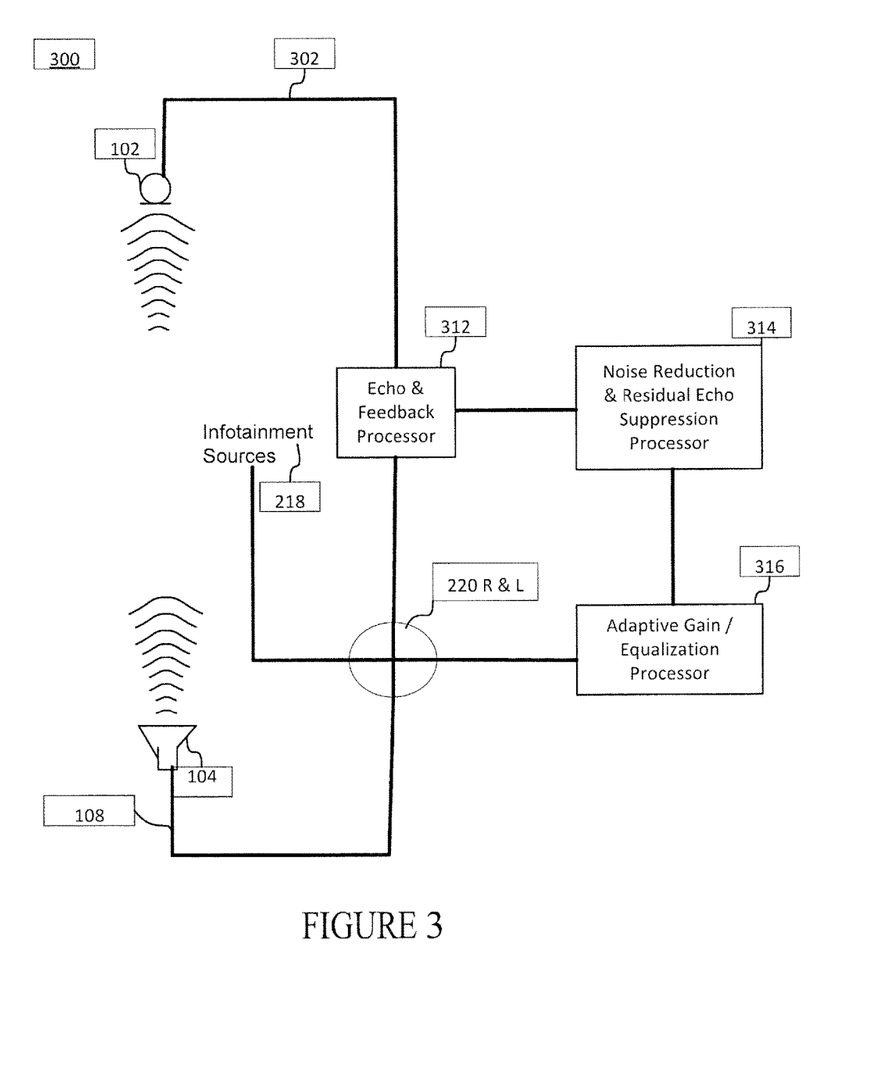
FIG. 3 is block diagram of a second speech reinforcement system that enhances seat-to-seat communication.

FIG. 3 is a schematic representation of a system for speech reinforcement. The system 300 is an example system for use in a vehicle. The example system configuration includes one or more microphones 102, two or more audio transducers 104, an echo and feedback processor 312, a noise reduction and residual echo suppression processor 312, and an adaptive gain/equalization processor 316. The one or more microphones 102 may capture the audio signal associated with the audio source 108, and the infotainment sources 218, creating one or more captured audio signal 302. The echo and feedback processor 312 cancels feedback and echo by modeling paths from each source to each microphone rather than modeling the physical paths from the loudspeakers to the microphones. The echo and feedback processor 312 estimates the echo within the vehicle environment based on these models and subtracts the estimated echo from the signals received from the one or more microphones. The optional noise reduction and residual echo suppression processor 314 suppresses noise and residual echo by separating the external virtual sources from the internal virtual sources. By calculating the estimated echo paths from the external and internal virtual sources to each of the microphones, the noise reduction and residual echo suppression processor 314 estimates the echo (e.g., energy level) received at the microphones and differentiate external echo, echo of the reinforcement signals, and local audio sources within the vehicle cabin through classification. The noise reduction and residual echo suppression processor 314 then applies the respective suppression based on the associated classifications. The adaptive gain/equalization processor 316 modifies the tone color and timbre of the echo cancelled signal and the adaptive gain adjusts the level of the reinforced signal rendered by the noise reduction and residual echo suppression processor 314 in response to the level of detected noise in the vehicle 100. The adapted and equalized signal is then added to the signal sourced by the stereo infotainment source 218 through the signal adder circuit 220 L and R, respectively. Thereafter, the reinforced signal is translated into analog signals and transmitted by loudspeakers 108. One or more optional enhancements described above may also be executed. These enhancements are executed by a signal processor executing the functions described above.

Figure 4:
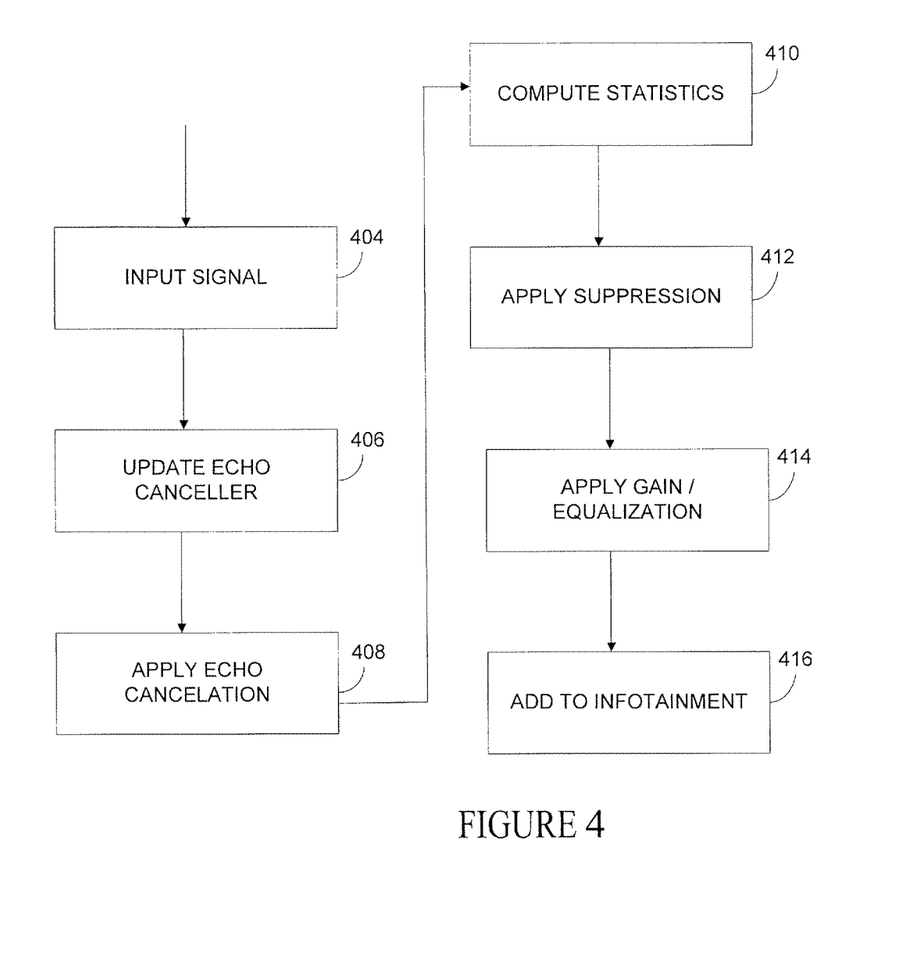
FIG. 4 is a process for reinforcing speech in a vehicle.

FIG. 4 is a process for reinforcing speech in a vehicle. The process may be implemented using any of the systems described herein with reference to FIGS. 1, 2, 3, and 5. The process reinforces speech by receiving the previously reinforced signal (the reinforced signal from the previous speech frame or segment) through a reinforced path and the infotainment signals at 404. At 406, the process models the acoustic environment of the vehicle by modeling the paths from each source to each microphone, and updates the echo canceller coefficients per each reference signal and each microphone. In a front-to-back reinforcement process modeling a stereo signal and a reinforcement signal, an exemplary process models three paths to the microphone representing the left and right stereo channels and the reinforcement signal of a prior speech or local source segment. The echo canceller coefficients to be updated in 406 may be Finite Impulse Response (FIR) or Infinite Impulse Response (IIR) adaptive filter coefficients per each microphone and each reference signal. In the example described above, there are three reference signals, one microphone and therefore three sets of echo canceller coefficients that are updated in 406. At 408, the process calculates or estimates the contributed echo from each of the virtual sources and subtracts it from the signal received at the microphone. When a residual echo suppression and noise reduction is applied at optional acts 410 and 412 the process separates the external virtual sources from the internal virtual sources, estimates the echo (e.g., energy level) from these sources, classifies the estimated echo by comparisons between signals E_ext[n], E_int[n], Y[n] and D[n], and applies a noise reduction and/or a residual echo suppression to the echo cancelled signal of 408. At 414 an optional adaptive gain and/or equalization modifies the tone color and timbre and an adaptive gain adjusts the level of the signal rendered by act 412 in response to the level of detected noise in the vehicle 100. The adapted and equalized signal may then be added to the signals sourced by an infotainment source at 416.

One or more ICC systems using speech reinforcement may be operated concurrently in alternative system and processes. The primary example described above uses the driver as the audio source communicating with one or more passengers positioned behind the driver. In a back-to-front reinforcement process, the driver may also be the listener and the passengers behind the driver may become the audio source. In yet another example, a third row of seats in a vehicle cabin may include an ICC system with speech reinforcement to communicate with all the other vehicle occupants in a front-to-back and back-to-front reinforcement that may run or operate concurrently. In yet another alternative, the ICC system executes one or multiple zone-to-zone reinforcements concurrently where occupied zones are detected by seat sensors or images captured by an in-vehicle camera so that reinforced substantially echo free audio is exchanged from zone-to-zone or seat-to-seat.

FIG. 5 is a block diagram of an alternate speech reinforcement in-car communication system that enhances seat-to-seat communication. The system comprises a processor 502, a non-transitory media such as a memory 504 (the contents of which are accessible by the processor 502) and an I/O interface 506. The memory 504 may store instructions which when executed by the processor 502 causes the system to render some or all of the functionality associated with ICC as described herein. For example, the memory 504 may store instructions which when executed by the processor 502 causes the system to render the functionality associated with echo and feedback cancellation 212, the optional noise reduction and residual echo suppression 214, the optional adaptive gain and equalization 216 and/or some or all combinations of the other optional enhancements described above. In addition, data structures, temporary variables and other information may store data in data storage 510.

The processor 502 may comprise a single processor or multiple processors that may be disposed on a single chip, on multiple devices or distributed over more than one system. The processor 502 may be hardware that executes computer executable instructions or computer code embodied in the memory 504 or in other memory to perform one or more features of the ICC system. The processor 502 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 504 or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 504 may comprise a single device or multiple devices that may be disposed on one or more dedicated memory devices or on a processor or other similar device. When functions or steps are said to be "responsive to" or occur "in response to" a function or a process, the device functions or steps necessarily occur as a result of the function or message. It is not sufficient that a function or act merely follow or occur subsequent to another. Further, when functions indicate an echo cancellation, echo is removed by subtracting an estimated echo from the transmitted or received signal; whereas when a functions indicates an echo suppression the amplitude of the echo signal is reduced through an attenuator.

The memory 504 may also store computer code, such as the echo and feedback processor 312, the optional noise reduction and residual echo suppression processor 314 and the optional active gain and/or equalization processor 316 as described herein. The computer code may include instructions executable with the processor 502. The computer code may be written in any computer language, such as C, C++, assembly language, channel program code, and/or any combination of computer languages. The memory 504 may store information in data structures including, for example, feedback and or echo canceller coefficients that render or estimate echo signal levels.

The I/O interface 508 may be used to connect devices such as, for example, additional microphones, audio transducers or loudspeakers, and receive external inputs 508 from other local or remote sources that communicate or interface to the ICC system.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The ICC system and process reinforces speech naturally without distortion or added noise in a vehicle. A vehicle may comprise, without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things.

The ICC system is fully automated such that the amount of reinforcement is continuously adapted to the actual echo and noise level estimated with in the vehicle cabin. So as different noise conditions are experienced, the reinforcement is immediately and smoothly adjusted and the driver does not need to operate any controls at all. It is a "set and forget" technology that can be safely left enabled so that it is ready to kick-in as sound is detected or as needed. The system eliminates howl and the unpleasant perceptible effects of echo. It operates at low delay so the talker will only perceive that their voice is slightly louder and not delayed or sounding processed. The low delay operation of the system reinforces speech so that is does not perceptibly interfere with direct, non-reinforced speech. The system is designed to reinforce speech and attenuate background noise so that the reinforced, echo cancelled, noise suppressed audio sounds natural despite the processing. The system is unaffected by its simultaneous or concurrent operation, its operation in musical environments and does not cause any perceptible distortion to music or other media playback. The system can be implemented on or within other car systems such as an infotainment processor and digital signal processors or DSPs and co-exist with other system software. The system is easy and quickly adapted to different vehicle and cabin types and different acoustic configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method that enhances speech through reinforcement comprising:
   capturing one or more microphone signals containing echo from loudspeaker signals reproduced by one or more loudspeakers;
   decomposing the loudspeaker signals into a plurality of virtual audio sources where the number of the plurality of virtual audio sources is less than the number of the one or more loudspeakers;
   estimating the echo paths from each of the plurality of virtual audio sources to each of the one or more microphones; and
   processing the captured microphone signals in response to the estimated echo paths by subtracting the echo contributions of each of the plurality of virtual audio sources to the one or more microphones.

2. The method of claim 1 where the plurality of virtual audio sources are linearly independent audio sources.

3. The method of claim 2 where the plurality of virtual audio sources is derived from stored characteristics stored in a non-transitory memory about a mixing of the independent audio sources that drive a plurality of loudspeakers.

4. The method of claim 1 where the subtracting of the echo contributions of each of the plurality of virtual audio sources is executed by a plurality of echo canceller instances that executes a plurality of adaption rules that differ between each of the plurality of virtual sources.

5. The method of claim 1 where the subtracting of the echo contributions of each of the plurality of virtual audio sources is executed by a plurality of echo canceller instances that apply a plurality of adaption parameters that differ between each of the plurality of virtual sources.

6. The method of claim 4 where the plurality of adaption rules establish a process executed when an audio condition occurs or the audio condition is detected.

7. A method that enhances speech through reinforcement comprising:
   capturing one or more microphone signals containing echo from loudspeaker signals reproduced by one or more loudspeakers;
   decomposing the loudspeaker signals into a plurality of virtual audio sources where the number of the plurality of virtual audio sources is less than the number of the one or more loudspeakers;
   estimating the echo paths from each of the plurality of virtual audio sources to each of the one or more microphones; and
   processing the captured microphone signals in response to the estimated echo paths by suppressing the echo contributions of each of the plurality of virtual audio sources to the one or more microphones.

8. The method of claim 7 further comprising segregating the plurality of virtual audio sources into external virtual sources and internal virtual sources.

9. The method of claim 7 where the level of suppression is based on a comparison to a plurality of predetermined threshold values stored in a non-transitory memory that renders detection of an external echo, an echo of a plurality of reinforcement signals, and an audio sourced by a plurality of local audio sources from within a vehicle cabin.

10. The method of claim 7 where the processing of the one or more microphone signals is activated based on a predicted echo level of each of the plurality of virtual sources at each of the one or more microphones.

11. The method of claim 7 where the processing of the one or more microphone signals is activated based on measured levels of the echo-cancelled microphone signals.

12. The method of claim 7 where the processing of the one or more microphone signals is activated based on an activation function used to selectively attenuate echo components while minimizing the attenuation of a desired signal.

13. A non-transitory machine readable medium encoded with machine-executable instructions, wherein execution of the machine-executable instructions is for:
   capturing one or more microphone signals containing echo from loudspeaker signals reproduced by one or more loudspeakers;
   decomposing the loudspeaker signals into a plurality of virtual audio sources where the number of the plurality of virtual audio sources is less than the number of the one or more loudspeakers;
   estimating the echo paths from each of the plurality of virtual audio sources to each of the one or more microphones; and
   processing the captured microphone signals in response to the estimated echo paths by subtracting the echo contributions of each of the virtual sources to the one or more microphones.

14. The non-transitory machine readable medium of claim 13 where the computer program code further processes the captured one or more microphone signals in response to the estimated echo paths by suppressing the echo contributions of each of the plurality of virtual sources to the one or more microphones after the subtraction of the echo contributions of each of the plurality of virtual sources to the one or more microphones.

15. The non-transitory machine readable medium of claim 13 where the plurality of virtual audio sources are linearly independent audio sources.

16. The non-transitory machine readable medium of claim 13 where the plurality of virtual audio sources is derived from stored characteristics stored in a non-transitory memory about a mixing of independent audio sources that drive a plurality of loudspeakers.

17. The non-transitory machine readable medium of claim 13 where the subtracting of the echo contributions of each of the plurality of virtual audio sources is executed by an echo canceller that executes a plurality of adaption rules that differ between each of the plurality of virtual sources.

18. A non-transitory machine readable medium encoded with machine-executable instructions, wherein execution of the machine-executable instructions is for:
   capturing one or more microphone signals containing echo from loudspeaker signals reproduced by one or more loudspeakers;
   decomposing the loudspeaker signals into a plurality of virtual audio sources where the number of the plurality of virtual audio sources is less than the number of the one or more loudspeakers;
   estimating the echo paths from each of the plurality of virtual audio sources to each of the one or more microphones; and
   processing the captured microphone signals in response to the estimated echo paths by suppressing the echo contributions of each of the plurality of virtual audio sources to the one or more microphones.

19. A system that enhances speech in a vehicle through reinforcement comprising:

a plurality of microphones capturing one or more microphone signals containing echo from loudspeaker signals reproduced by one or more loudspeakers;

a processor programmed to decompose the loudspeaker signals into a plurality of virtual audio sources where the number of the plurality of virtual audio sources is less than the number of the one or more loudspeakers;

the processor is further programmed to estimate the echo paths from each of the plurality of virtual audio sources to each of the one or more microphones; and the processor is further programmed to process the captured microphone signals in response to the estimated echo paths by subtracting the echo contributions of each of the plurality of virtual audio sources to the one or more microphones.

20. The system of claim 19 where the processor is further programmed to process the captured audio signal in response to the estimated echo paths by suppressing the echo contributions of each of the virtual sources to the one or more microphones after the subtraction of the echo contributions of each of the plurality of virtual sources to the one or more microphones.

\* \* \* \* \*